US012308992B2

(12) United States Patent
Nagar et al.

(10) Patent No.: US 12,308,992 B2
(45) Date of Patent: May 20, 2025

(54) ADAPTING ARTIFICIAL INTELLIGENCE (AI) ECOSYSTEM SPECIFICATIONS

(71) Applicant: International Business Machines Corporation, Armonk, NY (US)

(72) Inventors: Raghuveer Prasad Nagar, Kota (IN); Sarbajit K. Rakshit, Kolkata (IN); Subha Hari, Bangalore (IN); Smitha N Marutheesh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 17/444,179

(22) Filed: Jul. 30, 2021

(65) Prior Publication Data

US 2023/0036045 A1    Feb. 2, 2023

(51) Int. Cl.
   *H04L 12/28*      (2006.01)
   *G06F 21/31*      (2013.01)
   *G06N 5/02*       (2023.01)

(52) U.S. Cl.
   CPC .......... *H04L 12/2821* (2013.01); *G06F 21/31* (2013.01); *G06N 5/02* (2013.01)

(58) Field of Classification Search
None
See application file for complete search history.

(56) References Cited

U.S. PATENT DOCUMENTS

| | | |
|---|---|---|
| 2012/0265528 A1 | 10/2012 | Gruber |
| 2013/0204813 A1 | 8/2013 | Master |
| 2019/0121588 A1* | 4/2019 | Teruya .................. G06F 3/1241 |
| 2020/0005116 A1* | 1/2020 | Kuo ....................... H04L 67/568 |
| 2020/0099633 A1* | 3/2020 | D'Agostino .......... G06F 3/0481 |
| 2021/0065573 A1* | 3/2021 | Rakshit .................. G06N 5/022 |
| 2021/0117942 A1* | 4/2021 | Cottingham ......... G06Q 20/384 |
| 2022/0004954 A1* | 1/2022 | Rafferty ................. G06F 40/35 |

(Continued)

FOREIGN PATENT DOCUMENTS

CN         110995812 A     4/2020

OTHER PUBLICATIONS

"Can we build a self-adaptive software like the Matrix today?", PreScouter, Jul. 8, 2019, 4 pages, <https://becominghuman.ai/can-we-build-a-self-adaptive-software-like-the-matrix-today-316d6c91d4a6>.

(Continued)

*Primary Examiner* — William G Trost, IV
*Assistant Examiner* — Christopher P Cadorna
(74) *Attorney, Agent, or Firm* — Michael A. Petrocelli

(57) ABSTRACT

Adapting specifications of an artificial intelligence (AI) ecosystem are adapted, using a computer, based on an existing AI ecosystem of a user. A login is received, at the computer having a remote-based account of a user, to a new AI ecosystem. Specifications are determined from an existing AI ecosystem of the user, and the specifications include preferences and historical data related to the existing AI ecosystem based on usage of existing machines. Adaptive functionality is derived, using the computer, for new machines in the new AI ecosystem. The adaptive functionality is based on the specifications including the preferences and the historical data for the existing AI ecosystem. The specifications including the adaptive functionality is applied to the new machines of the new AI ecosystem.

20 Claims, 10 Drawing Sheets

(56) References Cited

U.S. PATENT DOCUMENTS

2022/0076674 A1\* 3/2022 Wu .................... G10L 17/22
2022/0292128 A1\* 9/2022 Sharifi ............... G10L 15/22

OTHER PUBLICATIONS

Brenon, et al., "Arcades: A deep model for adaptive decision making in voice controlled smart-home", Pervasive and Mobile Computing 49, arXiv:1807.01970v1, Jul. 5, 2018, 27 pages, <https://www.researchgate.net/publication/326167042_ARCADES_A_deep_model_for_adaptive_decision_making_in_voice_controlled_smart-home>.

Hasan Alhafidh, et al., "Design and Simulation of a Smart Home managed by an Intelligent Self-Adaptive System", Int. Journal of Engineering Research and Application, vol. 6, Issue 8, ( Part -1), Aug. 2016, pp. 64-90, <https://pdfs.semanticscholar.org/733a/6fdeb12dd4c15b08c8a55197a8848ba2fa71.pdf>.

Kandasamy, Jags, "It's Time for Adaptive AI to Enable a Smarter Edge", Latent AI, Inc., Jun. 21, 2019, 4 pages, <https://latentai.com/its-time-for-adaptive-ai-to-enable-a-smarter-edge/>.

Mell, et al., "The NIST Definition of Cloud Computing", National Institute of Standards and Technology, Special Publication 800-145, Sep. 2011, 7 pages.

Pais, et all., "Unsupervised Assistive and Adaptive Intelligent Agent in Smart Environment", ICIES 2015: International Conference on Intelligent Environments and Systems, Jan. 2015, 8 pages, <https://www.researchgate.net/publication/276274872_Unsupervised_Assistive_and_Adaptive_Intelligent_Agent_in_Smart_Environment>.

\* cited by examiner

Chart 1

| Devices | Home AI System | Hotel AI System |
|---|---|---|
| TV | User has 2 TVs at home, user can give a specific name to the TVs, and the user may call the TV a brand A TV. | A TV with a different specification (i.e., there is no brand A TV), it is different manufacturer, so if user initiates a voice command to switch on a brand A TV, then the command will not be executed. |
| Washing Machine | User has one washing machine, User can give command to execute Washing Machine | No Washing machine, Room service / Laundry will be washing the cloth, So user's Voice command will not be executing the Washing machine. |
| Floor Cleaning Robot | User has one Floor Cleaning robot | A common floor cleaning robot, but the guest has to request to help desk |
| Smart Light | User has Smart Light | Hotel Room is also having smart light. |
| Mini Bar | User does not have | Hotel is having a mini-bar. |
| Refrigerator | User has one refrigerator | Hotel does not have a refrigerator |

FIG. 5

ADAPTING ARTIFICIAL INTELLIGENCE (AI) ECOSYSTEM SPECIFICATIONS

BACKGROUND

The present disclosure relates to specifications of an artificial intelligence (AI) ecosystem, and, and more specifically, the present disclosure relates to adapting specifications of an AI ecosystem.

AI voice assistance systems can include receiving voice command, and accordingly the AI voice assistance system can execute one or more activities or provides search response to a user by outputting a simulated voice, or in another example, a text, email or other type of communication. In one example, a voice assistance ecosystem can include connected home appliances, for example, a washing machine, a refrigerator, an oven, a home heating air conditioning (A/C) control panel/unit, etc.

In one example situation, a user's profile data may not be associated to a particular voice assistance ecosystem, for example, a user may be at a new location such as a guest house, or a hotel etc. In this situation, the user may have an AI voice assistance ecosystem at a permanent location. However, at the new location, the user may not be able to log into their AI account. Even if the user can log into their own AI account, the user may not be able to leverage their own profile specific work as the new location will typically not have the same devices, equipment, or machines.

SUMMARY

The present disclosure recognizes the shortcomings and problems associated with current techniques for adapting specification of an AI ecosystem based on an existing AI ecosystem of a user or associated with a user.

In an aspect according to the present invention, a computer-implemented method for adapting specifications of an artificial intelligence (AI) ecosystem. The specifications is based on an existing AI ecosystem of a user, and includes receiving a login using a communications network, at a computer having a remote-based account of a user, to a new AI ecosystem. The method includes determining, using the cloud based account, specifications from an existing AI ecosystem of the user, and the specifications include preferences and historical data related to the existing AI ecosystem based on usage of existing machines. The method includes deriving adaptive functionality, using the computer, for new machines in the new AI ecosystem, and the adaptive functionality is based on the specifications including the preferences and the historical data for the existing AI ecosystem. The method includes applying the specifications including the adaptive functionality to the new machines of the new AI ecosystem.

In a related aspect, the method can further include determining workflow functions for existing machines in the exiting AI ecosystem and applying the workflow functions to new machines in the new AI ecosystem.

In a related aspect, the method can further include determining workflow functions for existing machines in the exiting AI ecosystem and adapting the workflow functions of the exiting machines for new machines in the new AI ecosystem.

In a related aspect, the method can further include determining workflow functions for existing machines in the exiting AI ecosystem and adapting the workflow functions of the exiting machines for new machines in the new AI ecosystem. The adapting of the workflow functions includes changing parameters of the workflow functions based on parameters of the new machines.

In a related aspect, the method can further include determining workflow functions for existing machines in the exiting AI ecosystem. The method can further include determining workflow function for new machines in the new AI ecosystem. Also, the method can further include analyzing the workflow functions for the existing machines and the new machines based on parameters for the new machines and the preferences and the historical data related to the existing AI ecosystem; and adapting the workflow functions of the exiting machines for new machines in the new AI ecosystem based on the analysis of the workflow functions.

In a related aspect, the new AI ecosystem is at a different location than the exiting AI ecosystem.

In a related aspect, the new AI ecosystem and the existing AI ecosystem include multiple machines or devices, respectively.

In a related aspect, the new AI ecosystem includes multiple devices with different availability, capacity, and specifications, from multiple devices in the existing AI ecosystem.

In a related aspect, the new AI ecosystem includes multiple devices with different specifications from multiple devices in the existing AI ecosystem, the specifications including availability, and capacity; and the method further comprising analyzing the specifications of the multiple devices in the new AI ecosystem and analyzing the specification in the existing AI ecosystem. The analysis including comparing the specifications, respectively, and determining modification or adaptions for the new AI ecosystem based on the analysis.

In a related aspect, the method further including generating a model at least in part incorporating the determining of the specifications from the existing AI ecosystem; updating the specifications from the existing AI ecosystem; and updating specifications from the new ecosystem; and updating the applying of the specifications from the existing AI ecosystem to the new AI ecosystem.

In a related aspect, the method can further include the existing ecosystem communicating with the cloud based account using a communications network.

In a related aspect, the historical data is stored in a knowledge corpus database.

In a related aspect, the remote-based account is cloud based.

In another embodiment according to the present invention, a system uses a computer for adapting specifications of an artificial intelligence (AI) ecosystem. The specifications are based on an existing AI ecosystem of a user, which comprises a computer system. The computer system includes; a computer processor, a computer-readable storage medium, and program instructions stored on the computer-readable storage medium being executable by the processor, to cause the computer system to perform the following functions to; receive a login using a communications network, at a computer having a remote-based account of a user, to a new AI ecosystem; determine, using the cloud based account, specifications from an existing AI ecosystem of the user, the specifications including preferences and historical data related to the existing AI ecosystem based on usage of existing machines; derive adaptive functionality, using the computer, for new machines in the new AI ecosystem, the adaptive functionality being based on the specifications including the preferences and the historical data for the existing AI ecosystem; and apply the specifications including the adaptive functionality to the new machines of the new AI ecosystem.

In a related aspect, the system further includes functions to: determine workflow functions for existing machines in the exiting AI ecosystem and applying the workflow functions to new machines in the new AI ecosystem.

In a related aspect, the system further includes functions to: determine workflow functions for existing machines in the exiting AI ecosystem and adapting the workflow functions of the exiting machines for new machines in the new AI ecosystem.

In a related aspect, the system further includes functions to: determine workflow functions for existing machines in the exiting AI ecosystem and adapting the workflow functions of the exiting machines for new machines in the new AI ecosystem, wherein the adapting of the workflow functions includes changing parameters of the workflow functions based on parameters of the new machines.

In a related aspect, the system further includes functions to: determine workflow functions for existing machines in the exiting AI ecosystem; determine workflow function for new machines in the new AI ecosystem; analyze the workflow functions for the existing machines and the new machines based on parameters for the new machines and the preferences and the historical data related to the existing AI ecosystem; and adapt the workflow functions of the exiting machines for new machines in the new AI ecosystem based on the analysis of the workflow functions.

In a related aspect, the new AI ecosystem is at a different location than the exiting AI ecosystem.

In another embodiment according to the present invention, a computer program product for adapting specifications of an artificial intelligence (AI) ecosystem includes the specifications based on an existing AI ecosystem of a user. The computer program product includes a computer readable storage medium having program instructions embodied therewith. The program instructions are executable by a computer to cause the computer to perform functions, by the computer, comprising the functions to: receive a login using a communications network, at a computer having a remote-based account of a user, to a new AI ecosystem; determine, using the cloud based account, specifications from an existing AI ecosystem of the user, the specifications including preferences and historical data related to the existing AI ecosystem based on usage of existing machines; derive adaptive functionality, using the computer, for new machines in the new AI ecosystem, the adaptive functionality being based on the specifications including the preferences and the historical data for the existing AI ecosystem; and apply the specifications including the adaptive functionality to the new machines of the new AI ecosystem.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 5 is a chart (Chart 1) illustrating devices and machines in one column in relation to a home AI system and a hotel AI system, according to an embodiment of the present disclosure.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
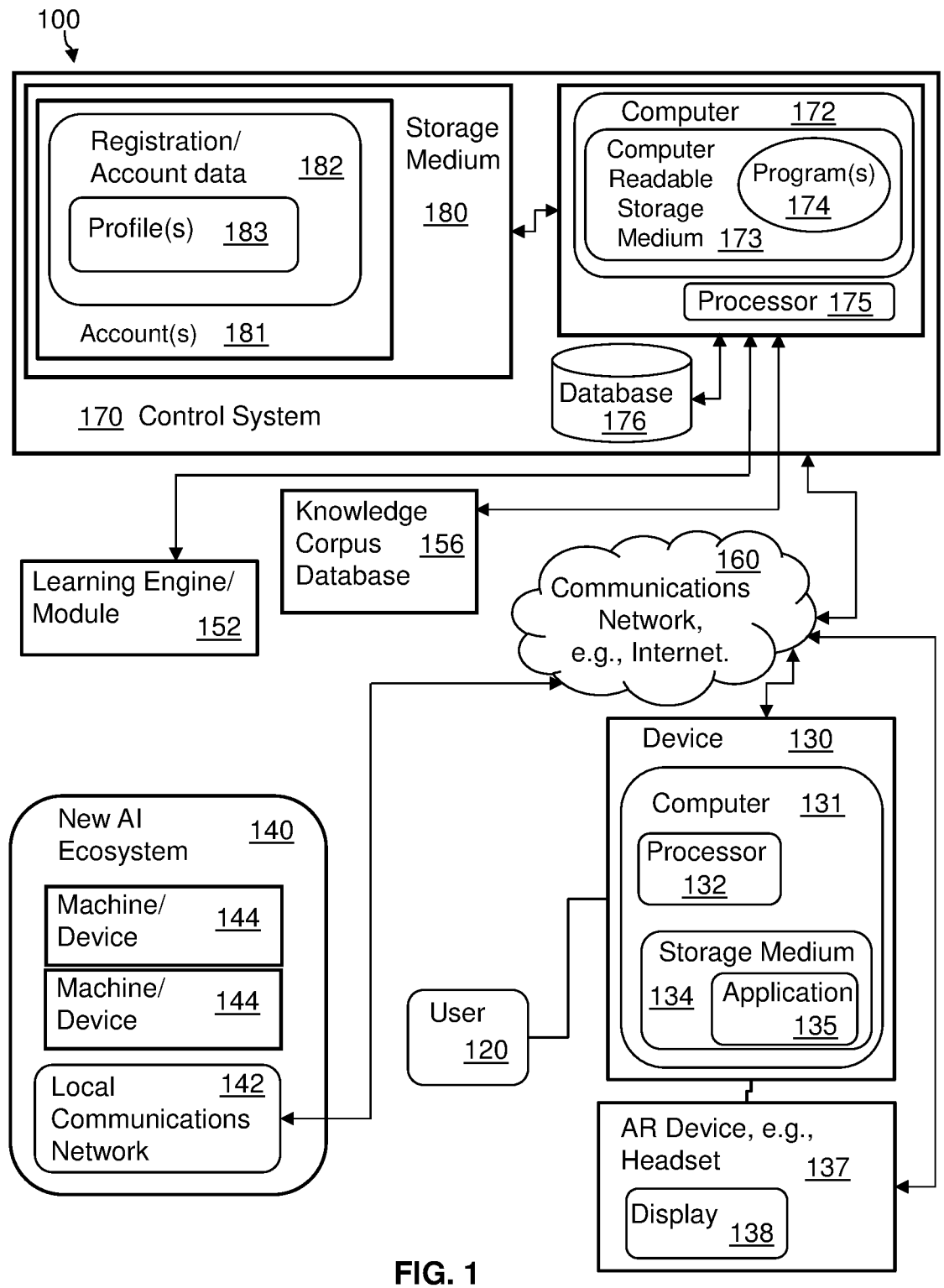
FIG. 1 is a schematic block diagram illustrating an overview of a system, system features or components, and methodology for adapting specifications of an artificial intelligence (AI) ecosystem, where the specifications are based on an existing AI ecosystem of a user, according to an embodiment of the present disclosure.
Figure 2:
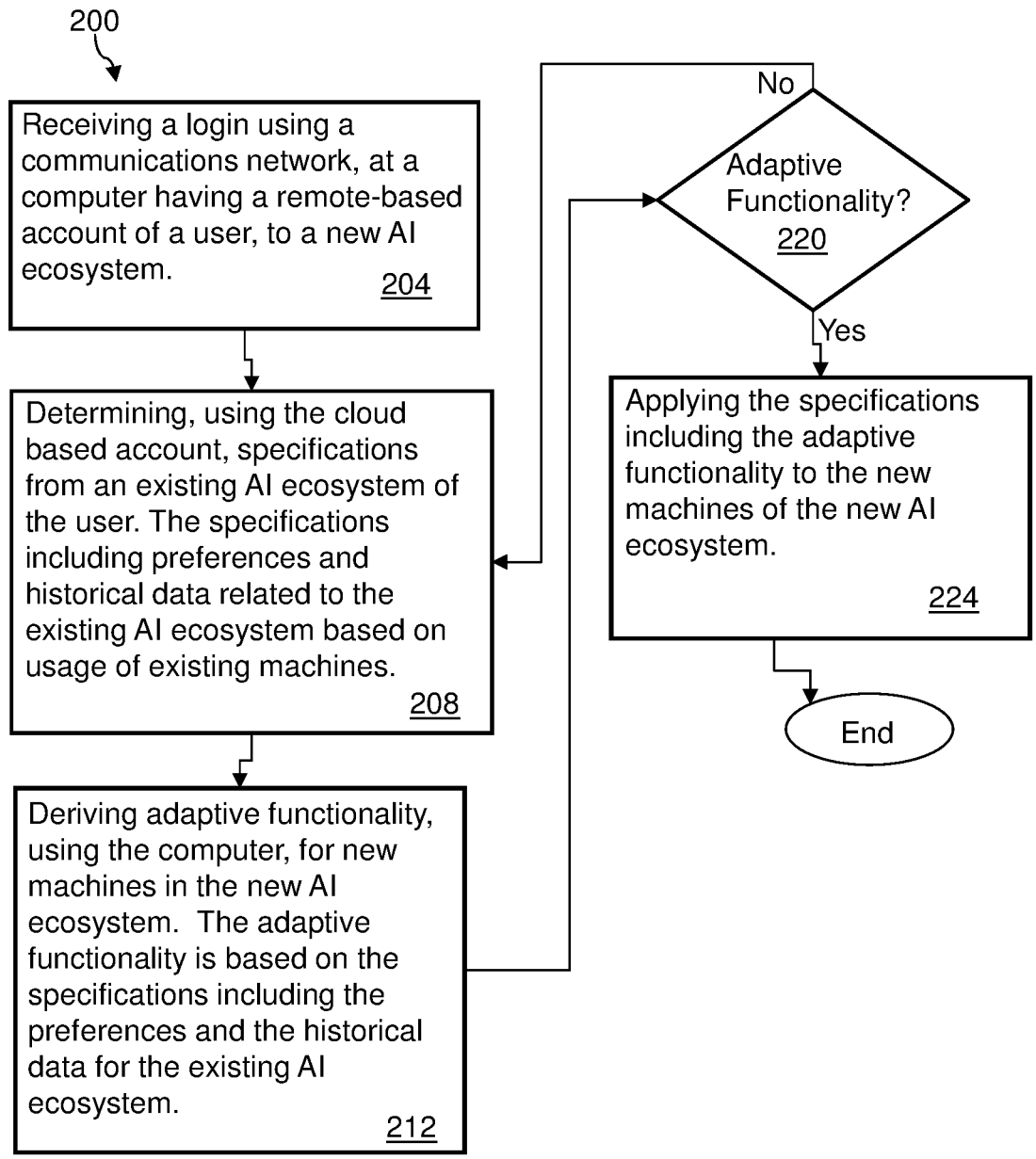
FIG. 2 is a flow chart illustrating a method, implemented using the system shown in FIG. 1, for adapting specifications of an artificial intelligence (AI) ecosystem, according to an embodiment of the present disclosure.
Figure 3:
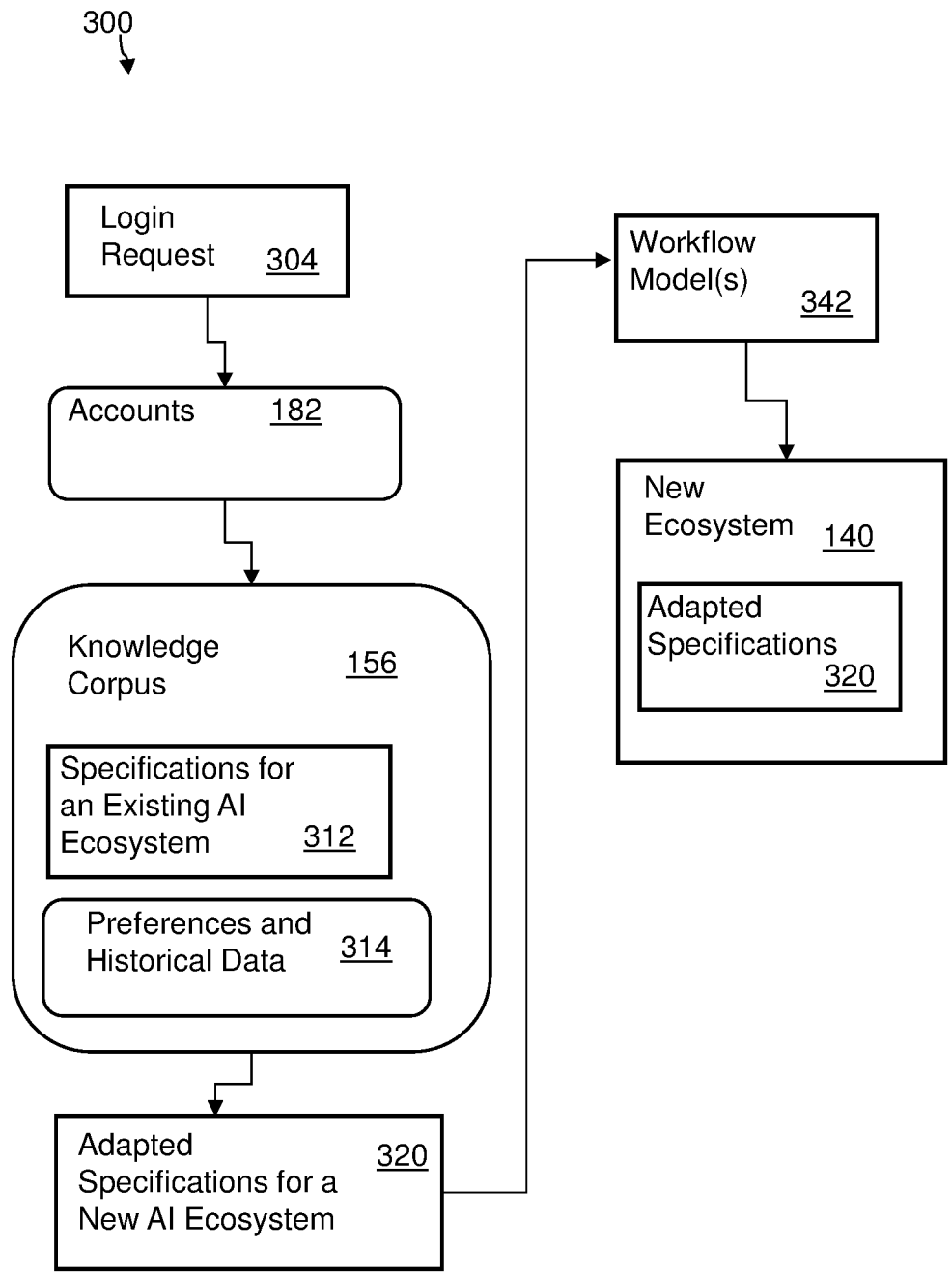
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for adapting specifications of an artificial intelligence (AI) ecosystem, where the specifications are based on an existing AI ecosystem of a user.

Referring to FIGS. 1, 2 and 3, a computer-implemented method 200 for adapting specifications of an artificial intelligence (AI) ecosystem, where the specifications 312 are based on an existing AI ecosystem of a user, according to an embodiment of the present disclosure, includes operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

Referring to FIGS. 1, 2 and 3, the method 200 includes receiving a login 304 using a communications network 160, at a computer 131 in a device 130 having a remote-based account 181 of a user 120, to a new AI ecosystem 140, as in block 204. The communications network 160 can be the Internet. The device 130 includes a computer 131 which includes a processor 132 and a storage medium 134 which can store an application 135. The application can include all or part of instructions to implement the method of the present disclosure, embodied in code and stored on computer readable storage medium. User accounts 181 can be stored on a storage medium 180 which is part of a control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The new AI ecosystem can include a plurality of machines or devices 144. The new AI ecosystem can include a local communications network 142 which can communicate with the communications network 160. The system 100 can include a learning engine/module 152, which can be at least part of the control system or communicating with the control system, for generating a model or learning model. The learning model generates workflow models for a new AI ecosystem for the machine/devices in the new AI ecosystem, based on historical data regarding previous or existing current AI ecosystem(s). Such modeling is discussed in more detail below.

The method 200 further includes determining, using the cloud-based account, specifications 312 from an existing AI ecosystem of the user, as in block 208. The specifications can include preferences and historical data 314 related to the existing AI ecosystem based on usage of existing machines, also in block 208. The historical data can be stored in a knowledge corpus database 156, which can be at least part of the control system, or part of another computer system which communicates with the control system. In one example, the existing ecosystem communicates with the control system which can include past communications and/or current communications, and the user account can be a cloud-based account using a communications network.

The method 200 includes deriving adaptive functionality, using the computer, which can include the device computer 131 working in part with the controls system computer 172, as in block 212, for new machines in the new AI ecosystem. The adaptive functionality is based on the specifications including the preferences and the historical data for the existing AI ecosystem, also as in block 212. For example, the adaptive functionality includes the method and system deriving from the specifications and preferences of the existing AI ecosystem, specifications and functionality for devices in the new AI ecosystem. For example, the method and system can access the knowledge corpus database 156 for past specification and preferences based on one or more previous or currently existing AI ecosystems.

In one example, the method and system can use the learning module 152 to analysis historical data from previous and existing/current AI ecosystems, and derive from the historical data and/or existing AI ecosystem specifications and workflow for devices in the new AI ecosystem. For instance, the learning module can model the new AI ecosystem based on the historical data, and iteratively design workflows for the new devices based on the historical data. For example, if an existing AI ecosystem included washing machine and the new AI ecosystem does not, the system can recommend a laundry service. If the existing AI ecosystem includes a an oven model for prepping dinner, and the new AI ecosystem includes a different model of oven, the method and system can adapt instructions for prepping dinner to the new AI ecosystem.

At block 220, when the adaptive functionality is not derived, the method returns to block 208. When, at block 220, the adaptive functionality is derived, the method continues to block 224. The method 200 includes applying the adapted specifications 320 including the adaptive functionality to the new machines of the new AI ecosystem, as in block 224. The adaptive specifications and functionality can include workflows for one or more machines. The workflows can include instructions for implementing one or more machines alone or in sequence.

In one example, the method can include determining workflow functions for existing machines in the existing AI ecosystem, and applying the workflow functions to new machines in the new AI ecosystem. For instance, the method and system can use existing workflow functions and apply those workflow functions to new machines in the new AI ecosystem.

In another example, the method can further include determining workflow functions for existing machines in the existing AI ecosystem, and adapting the workflow functions of the exiting machines for new machines in the new AI ecosystem. For instance, the method and system can use existing workflow functions and adapt the workflow functions for new machine in the new AI ecosystem. For example, when new machines are different models or manufacturers and/or function differently.

In another example, the method can include determining workflow functions for existing machines in the exiting AI ecosystem and adapting the workflow functions of the exiting machines for new machines in the new AI ecosystem. The adapting of the workflow functions includes changing parameters of the workflow functions based on parameters of the new machines. For example, parameters can include times, dates, setting on an appliance, etc., which can be applied from an existing AI system to a new AI system.

Figures 4A, 4B:
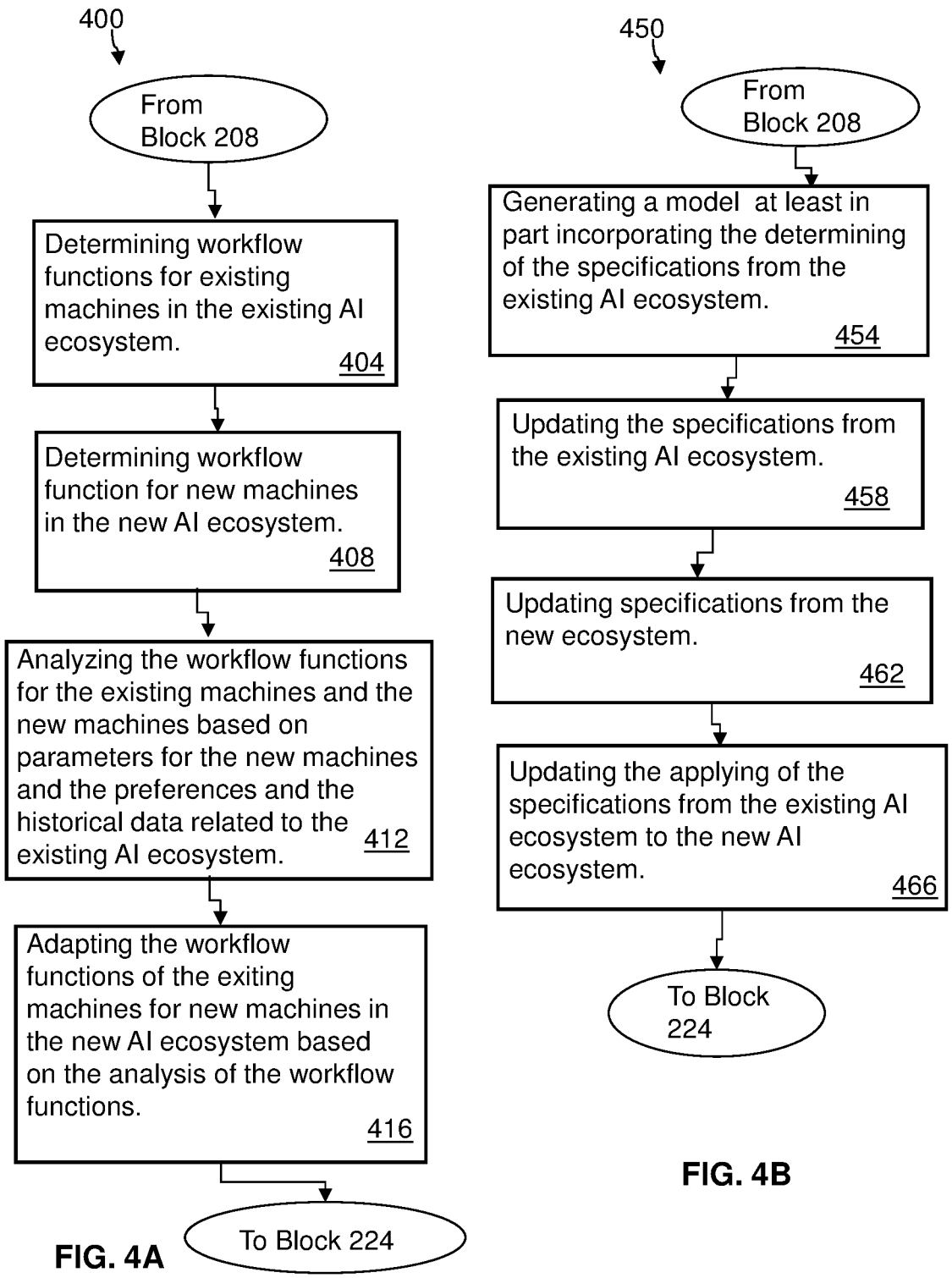
FIG. 4A is a flow chart illustrating another method, which continues from the flow chart of FIG. 2, for adapting specifications of an artificial intelligence (AI) ecosystem.
FIG. 4B is a flow chart illustrating another method, which continues from the flow chart of FIG. 2, for adapting specifications of an artificial intelligence (AI) ecosystem, where the specifications are based on an existing AI ecosystem of a user.

Referring to FIG. 4A, in another embodiment according to the present disclosure, a method 400 can continue from block 220 of the method 200 shown in FIG. 2, and can further include determining workflow functions for existing machines in the existing AI ecosystem, as in block 404.

The method 400 includes determining workflow function for new machines in the new AI ecosystem, as in block 408. Such workflow functions can include machine specifications and machine procedures and options. For example, a manufacturer and model of washing machine can have workflow options such as cleaning cycles. Further workflow options can include a user using machines in sequence or on specific days. The method further including analyzing the workflow functions for the existing machines and the new machines based on parameters for the new machines and the preferences and the historical data related to the existing AI ecosystem. The method further including adapting the workflow functions of the exiting machines for new machines in the new AI ecosystem based on the analysis of the workflow functions. The method can proceed to block 224 of the method 200 shown in FIG. 2.

The new AI ecosystem can be at a different location than the exiting AI ecosystem. Additionally, the new AI ecosystem and the existing AI ecosystem can include multiple machines or devices, respectively. The new AI ecosystem can include multiple devices with different availability, capacity, and specifications, from multiple devices in the existing AI ecosystem.

In another example, a new AI ecosystem can include multiple devices with different specifications from multiple devices in the existing AI ecosystem. The specifications can include availability, and capacity. The method can further include analyzing the specifications of the multiple devices in the new AI ecosystem and analyzing the specification in the existing AI ecosystem. The analysis can include comparing the specifications, respectively, and determining modification or adaptions for the new AI ecosystem based on the analysis.

In another embodiment according to the present disclosure, referring to FIG. 4B, a method 450 can continue from block 208 of the method 200 shown in FIG. 2, the method can include generating a model 342 at least in part incorporating the determining of the specifications from the existing AI ecosystem, as in block 454. The method further includes updating the specifications from the existing AI ecosystem, as in block 458. The method includes updating specifications from the new ecosystem, as in block 462. The method further including updating the applying of the specifications from the existing AI ecosystem to the new AI ecosystem, as in block 466. The method 450 then can proceed to block 224 of the method 200 in FIG. 2.

In another example, the method can further include the existing ecosystem communicating with the cloud-based account using a communications network. In another example, the historical data can be stored in a knowledge corpus database. In another example, the remote-based account can be cloud based.

In another example, related to the method 450, the model 342 can include determining, using the computer, a type of machine and workflow, using the knowledge corpus database 156 to determine a type of machine, a type of workflow, or define one or more workflows. The knowledge corpus 156 can be populated by historical data related to machine/devices, environments, AI ecosystems, etc., gathered from previous environments and histories. In one example the data from historical events can be automatically gathered, and in another example, data can be inputted into the computer or directly into the corpus automatically, manually, or a combination of both, or in another example or from the computer to the corpus, such as from IoT devices, etc. In one example, the computer can identify machine or devise in the AI environments by comparing a visual picture or video feed of an object to a corpus database of items. The identification can be scored for veracity or confidence of identification with a confidence score.

In another example, a notification, using the computer, can be sent to a user's device with confirms the AI system adapting to the new AI environment. In another example, a notification can be sent to a user's device where the notification includes a question to the user for confirming a workflow and/or a use of a device in a new AI environment.

In another example, a user can use an augmented reality device having a display 138. In one example, the augmented reality (AR) device can be an AR headset. In another example, the augmented reality device can be AR glasses, or an AR wearable. Using the AR device can include a visual cue to a user, a selection of one or more options by the user, or a physical action such as a hand gesture or a finger pointing, wherein such physical actions can work in concert with the AR device to implement an action initiated by the user, or select options presented to the user using the system. For instance, a user can select workflow options and/or machines. The AR device can communicate with the user's device 130, and/or alternatively, communicate with a communications network 160.

In another example, the method can further include initiating two-way communications with an AR device available to the user, and generating, using the computer communicating with the AR device, a recommendation for a workflow or a procedure in an AI ecosystem. The method can include communicating the workflow or procedure to the AR device for communication to the user, and iteratively communicating updated procedures to the AR device. The method can further include receiving an update request from the AR device initiated by the user. In one example, the method can include receiving acceptance of the recommendation for a workflow or a procedure from the user's device.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 152 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

In one embodiment according to the present disclosure, a temporary location can include an AI Voice assistance system which is not identical to a user's permanent AI Voice assistance ecosystem, even if the user logs in with their cloud account. This issue can be due to participating devices being different, and having different capacities and specification of the devices. In the temporary location, the workflow may be executed in a similar manner with a permanent home ecosystem. For example, referring to FIG. 5, Chart 1 500 includes a list of devices 504 in a home AI ecosystem 508, and a hotel room AI ecosystem 512. One device is a TV (television), and the user has 2 TVs at a home. The use can give a specific name to the TVs and a user may call the TV a brand A TV. When the user is at a hotel with an AI system, a TV can have a different specification, that is, there is not a brand A TV. Thus, if a user initiates a voice command to switch on a brand A TV, the command will not be executed, as the hotel AI ecosystem does not include a brand A TV. Continuing with Chart 1, a user can have a washing machine which can receive voice commands from the user. The hotel may not have a washing machine, thus a user voice command for a washing machine will not be executed. In another example, a user can have a cleaning robot and the hotel can have a common floor cleaning robot, but is not the same brand as at the user's home. The user can also have a smart light, and the hotel can include a smart light. A user does not have a mini bar, but the hotel has a mini-bar. The user can have a refrigerator in their home, and the hotel does not include a refrigerator.

Embodiments of the present disclosure include methods and systems by which, in a new location (which has, for example, a different specification, configuration, availability, capacity of the devices) if user logins with their cloud account, then the method and system of the present disclosure will auto-adapt the AI voice assistance system and execute the workflow based on the available capacity, specification etc., in the new location.

Figure 6:
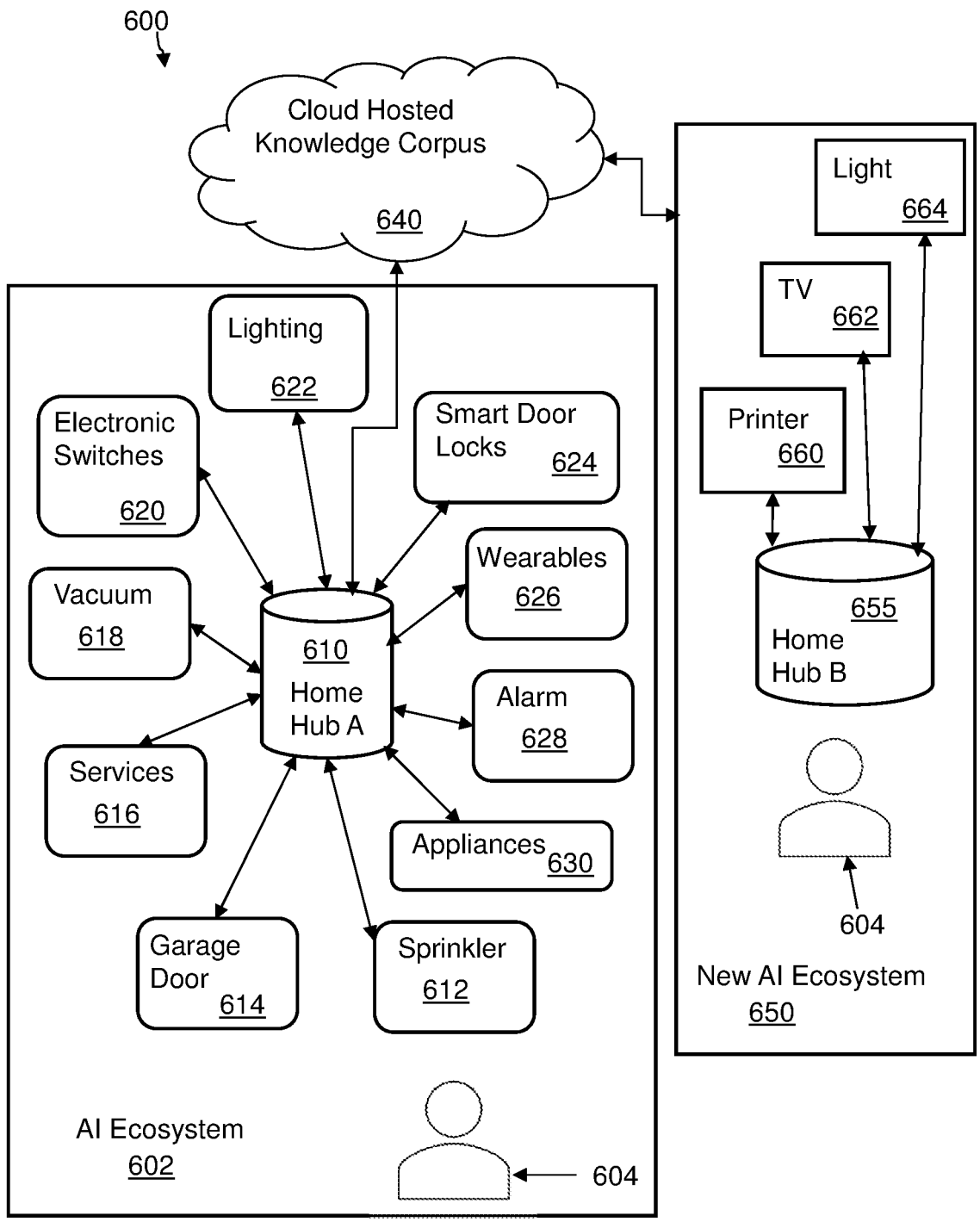
FIG. 6 is a block diagram illustrating another system according to an embodiment of the present disclosure, for adapting specifications of an artificial intelligence (AI) ecosystem, where the specifications are based on an existing AI ecosystem of a user.

Referring to FIG. 6, a system 600 according to one embodiment of the present disclosure includes an AI ecosystem 602 including a home hub 610. A user 604 can access a plurality of machines or devices using a home hub A 610. The home hub A 610 communicates with the plurality of machines, for example, a sprinkler system 612, a garage door opener 614, service device 616 such as car services, or retail services, or information services, a vacuum 618, electronic switch 620, such as electrical outlets, lighting 622, smart door locks 624, wearables 626, an alarm system 628, appliances 630, and a sprinkler system 612. The home hub A 610 communicates with a cloud hosted knowledge corpus 640. The corpus 640 can include user accounts. The corpus 640 also communicates with a new AI ecosystem 650 via a home hub B 655. The new AI ecosystem 650 incudes a plurality of machines, for example, a printer 660, a TV 662, and a light 664 which communicate with the home hub B 655. The user 604 can move between the two ecosystems. The two ecosystems can be at different locations within a venue, or simply two different geographical locations.

Referring to FIGS. 5 and 6, in one example, when a user logs into a new AI voice assistance ecosystem using an existing cloud account, the new AI voice assistance ecosystem can understand a user's command from the existing or previous AI ecosystem using a historical knowledge corpus. Further, the new AI ecosystem can translate the command as per the capability, specification, and availability, etc. of the devices in the new AI voice assistance ecosystem, and can also execute the workflow or activity.

For example, referring to FIG. 5, an AI system can be part of an existing knowledge, and the washing machine can be part of a workflow. The AI system can start the washing machine automatically, but in a new AI ecosystem, such as a hotel room, there is no washing machine. To complete the workflow, the new AI Voice assistance ecosystem can understand the user wants to clean cloths, and the AI voice assistance system can register a call to room service to take the cloths and initiate a cloths wash.

If a user initiates an AI voice assistance system to perform an activity by specifying a device name, in a new environment the name may not be present or could be assigned to a different device. A method and system according to the present disclosure, can use an existing knowledge corpus, to identifying the intend of the activity and functionality of the activity, and accordingly the activity can be executed in the appropriate device in new environment. The system can use the existing knowledge corpus to recognize a device in the new environment based on a required functionality.

For example, a user's personal AI voice assistance ecosystem can have two TVs (televisions), name of one TV can be "Flat", and another can be "Curved". For instance, in a new location, there may be only one TV. In the new environment, if a user says, "Please Start the Flat", then the new voice assistance ecosystem will not understand what is Flat, but using a knowledge corpus the method and system of the present disclosure can identify "Flat" means a TV, so the system can automatically assigning the names "Flat" and "Curved" to the TV present in the new ecosystem.

In a new environment, the system can proactively identify which activities or needs of the user can't be executed based on the availability, capacity and configuration of the devices in the new environment. Accordingly, the system can proactively notify a service desk for an alternate arrangement to support a guest. For example, by analyzing a user's pattern of voice command, the proposed system can identify that, the user wants coffee, but in the room there is no coffee machine. Thus, a hotel service will be updated with information, that the guest needs coffee at a particular timing, so that the guest can have similar facilities in the new environment.

In another example, a user can register in a cloud account to a new AI Voice assistance Ecosystem. Then, a method and system according to the present disclosure can perform a comparative analysis of capabilities, availabilities, and capacities of the user's devices with the devices in the new environment, and the system can notifying the user in advance of what activities can't be performed in the new activities, and what are alternates to those activities.

For example, a user can login to a new environment with a cloud account. The system can compare the capabilities, availabilities, and capacities of the new environment with the user's home devices, and will be identifying which command can't be executed, and what are the alternate so that the user is aware of the alternatives.

Referring to FIG. 5, a user can have a home AI voice assistance ecosystem, and now the user is travelling to a location and staying in a remote location such as a guest house or hotel. In the new location, the user can login to the cloud account, and the system can automatically self-adapt as per the capabilities, availabilities, and capacities of the new AI voice assistance ecosystem.

Additionally, in the examples and embodiments of the present disclosure, a user can have a cloud account to access AI Voice assistance, and the user can connect to any AI voice assistance system with their account. Using historical learning about a user's commands, activities etc., an AI voice assistance system can create a knowledge corpus for a user's activities. The knowledge corpus can be used to performing the activities by an AI voice.

Assistance system in an autonomous manner. In an AI Voice assistance ecosystem, each and every device will be paired with a respective AI voice assistance ecosystem. Every device in the AI voice assistance system can be identified uniquely, and accordingly will identify the specification, and capabilities of the devices. The user can also specify different names to different devices, and accordingly the AI voice assistance system can recognize the device with the name. Based on the knowledge corpus created, the proposed system can identify a sequence of activities. The functionalities of each step can be identified and can be mapped with the devices. When a user moves to a new location, and the new location also has an AI voice assistance ecosystem, in the new AI voice assistance ecosystem multiple devices can be identified, and each of the devices can be paired with the AI voice assistance system of the new Ecosystem. In the new location, user has to login with his cloud account, the proposed system will be connecting to the new AI voice assistance ecosystem.

Once the user logs into a cloud based, or remote AI assistance ecosystem, the user can login to the new AI ecosystem, for example as a guest, then the new AI voice assistance system can access the knowledge corpus of the user. As the AI voice assistance system at the new location is also accessing the same knowledge corpus, so it will also be expecting the same devices, configuration, specification, capacity and availability. The new AI voice assistance ecosystem can compare the capabilities, availabilities, and capacities of the devices with the capabilities, availabilities, and capacities of the user's devices in their AI Voice assistance ecosystem. Based on the comparison, the system can identify what types of activities or steps in any workflow can't be executed in the new AI voice assistance ecosystem. Using historical learning the system can identify what types of activities or command the user may be submitting. The system can identify what activities can't be executed in the new AI Voice assistance ecosystem, and the user can be notified in advance. In the new AI voice assistance ecosystem, the devices can be paired and how different activities are performed can be identified. When a user submits a voice command, e.g., in voice command mode in a new AI voice assistance ecosystem, then the system can use a user's knowledge corpus, and can identify alternate devices and steps which can be executed. The system can also use historical learning on what types of activities or functionalities are performed in the New AI voice assistance ecosystem, for example, for washing clothes, a guest has to call the Room Service or Laundry, so the system can identify washing clothes means calling room service or laundry, so instead of washing clothes in washing machine, room service can be called. The system can adapt the user's activity as per the specification, availability and capacity of the new AI voice assistance ecosystem.

Embodiments and examples of the present disclosure can be specific to machine learning across virtual assistants. Which can apply to a new user location, and which can have a different specification, configuration, availability and capacity of the devices. If a user logs in with a cloud account, the system can auto-adapt the AI Voice assistance system and can execute the workflow based on the available capacity, availability and specification. Embodiments of the present disclosure analyzes, converts and applies an AI output to a new AI ecosystem or within a new AI ecosystem based on the components of the new Ecosystem. Thus, the system can apply interactions of an inference engine for analysis and apply the interactions to another ecosystem.

Thus, the present disclosure includes a system for detecting components of an ecosystem that a user is currently part of, where the system may not recognize components in the new AI ecosystem. The system can map the commands to the components of the current or new AI ecosystem in real time based on the history data from the user. The component recipients would not be part of the history data of the user, but the existing history data is analyzed to identify the new recipients in the current or new ecosystem, i.e. the history component and the new component in new ecosystem share features and the AI based assistance identifies these partners to execute voice commands. This can happen without user needing to think or learn new voice commands. Thus, the system gets context from the previous conversation history and then converts and applies to the components of the current ecosystem and the components of the current ecosystem can be different from the system that exists in history data.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 7:
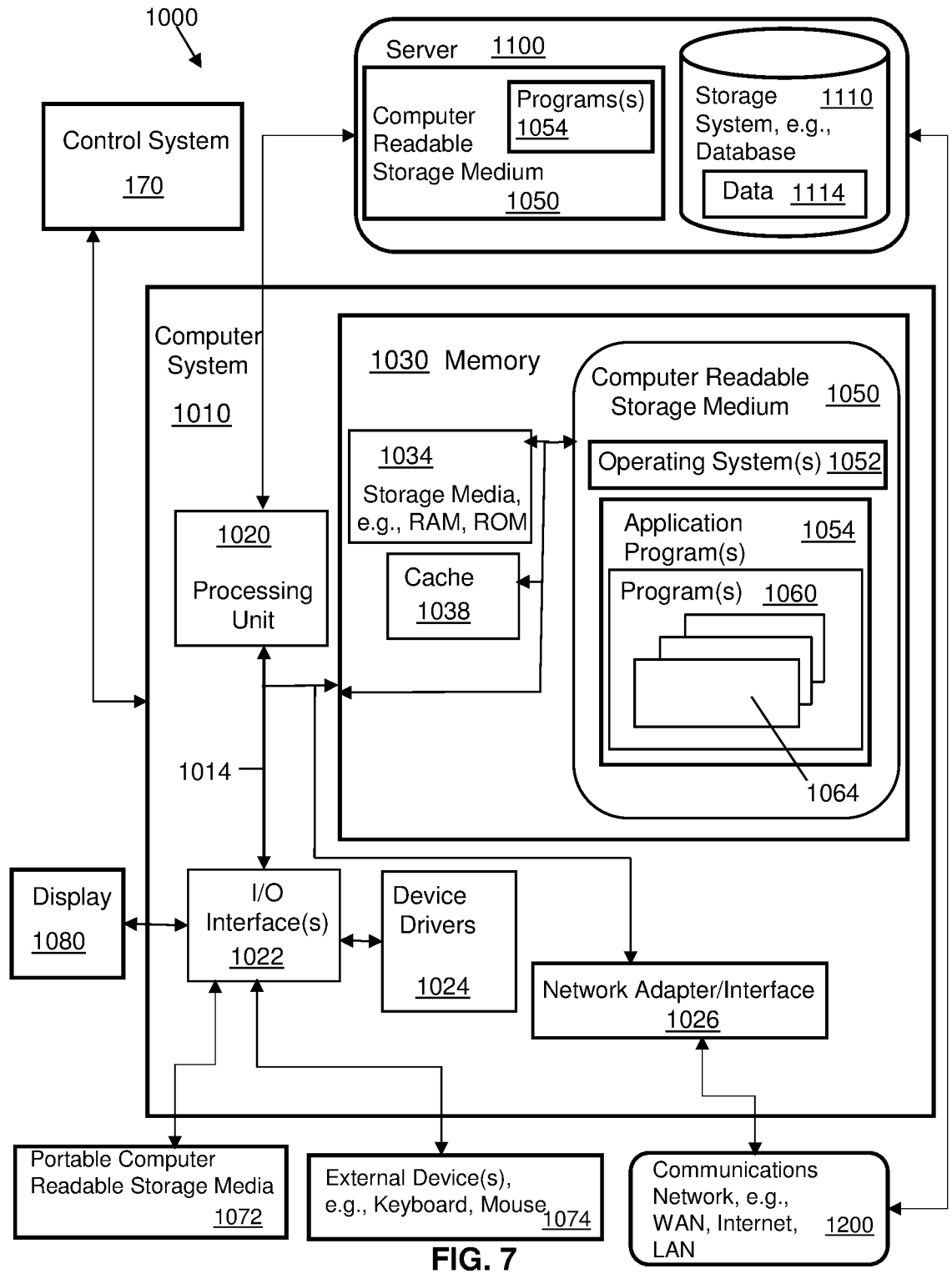
FIG. 7 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 7). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 7 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 7 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model. The learning model can generate workflow models for a new AI ecosystem for machines/devices in the new AI ecosystem.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 7, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 8:
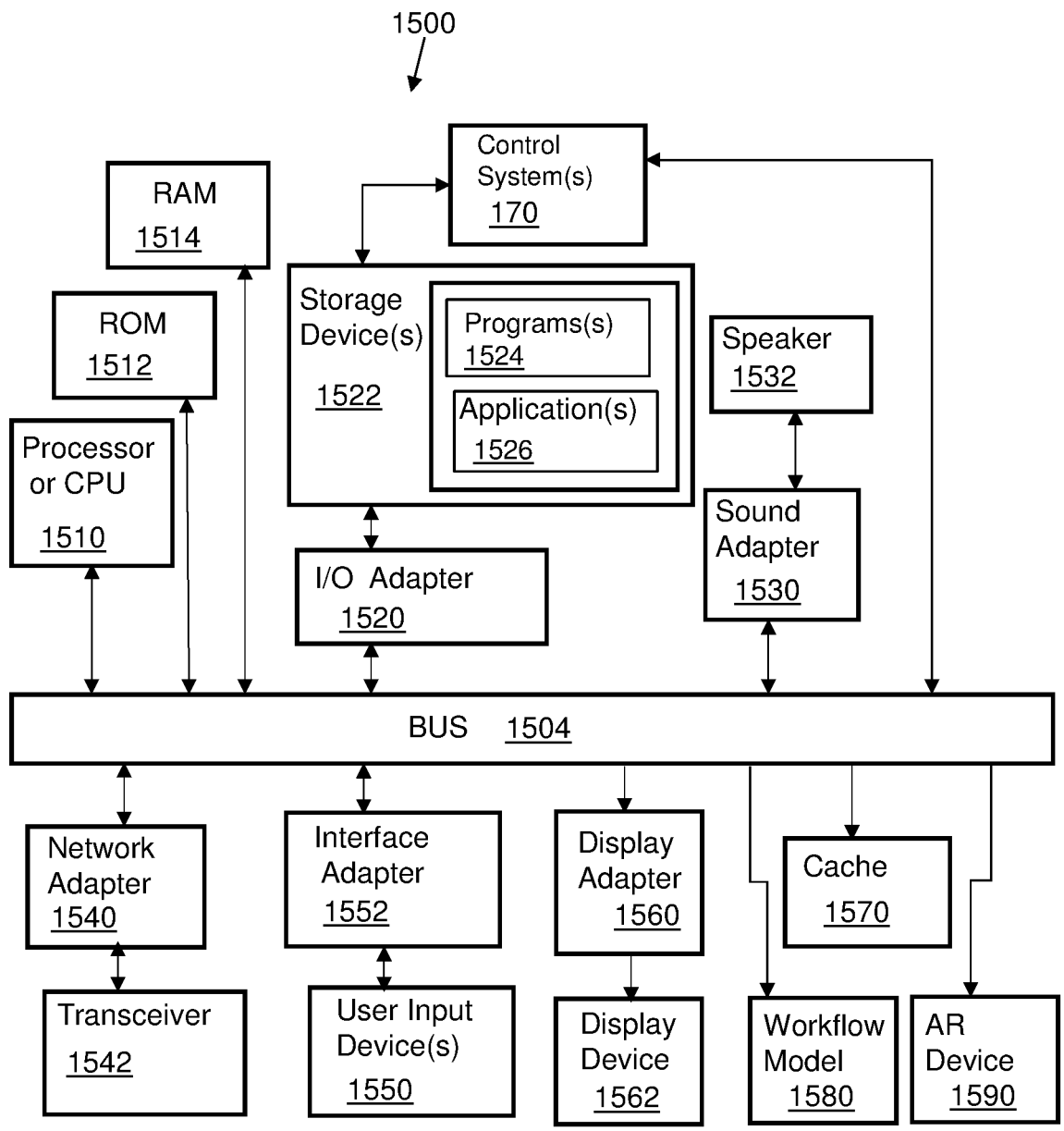
FIG. 8 is a schematic block diagram of a system depicting system components interconnected using a bus. The components for use, in all or in part, with the embodiments of the present disclosure, in accordance with one or more embodiments of the present disclosure.

Referring to FIG. 8, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1590 can also be operatively coupled to the bus 1504. A model such as a workflow model 1580 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
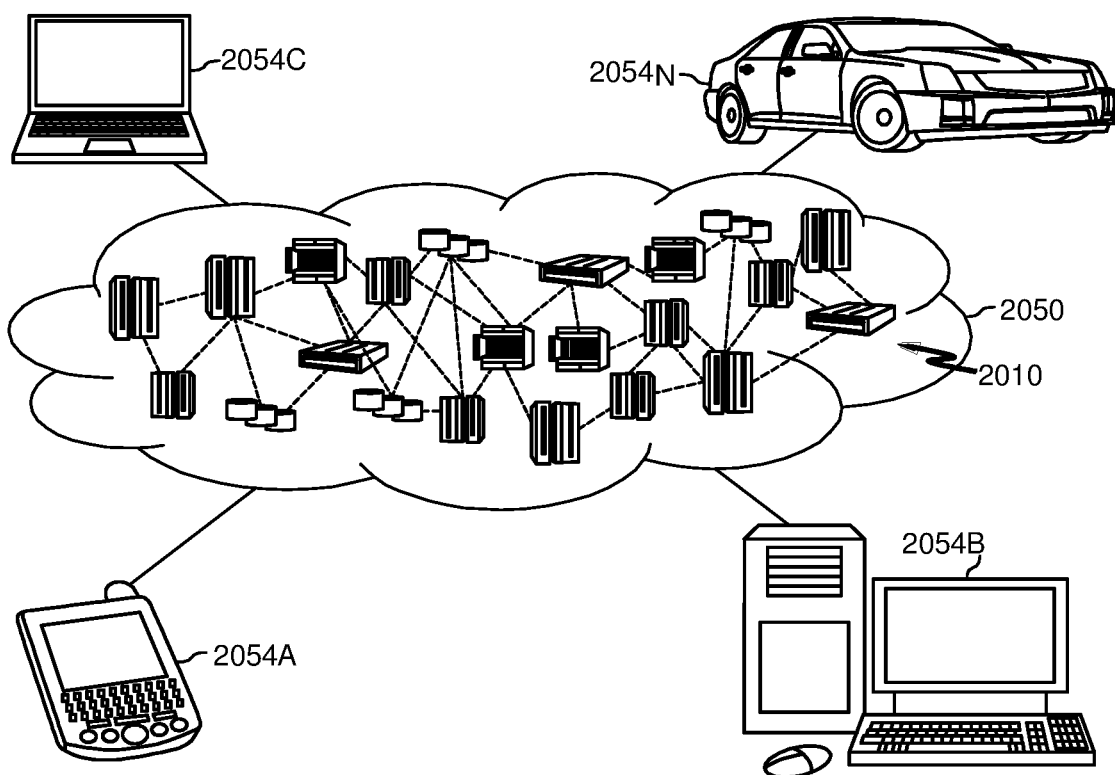
FIG. 9 is a block diagram depicting a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
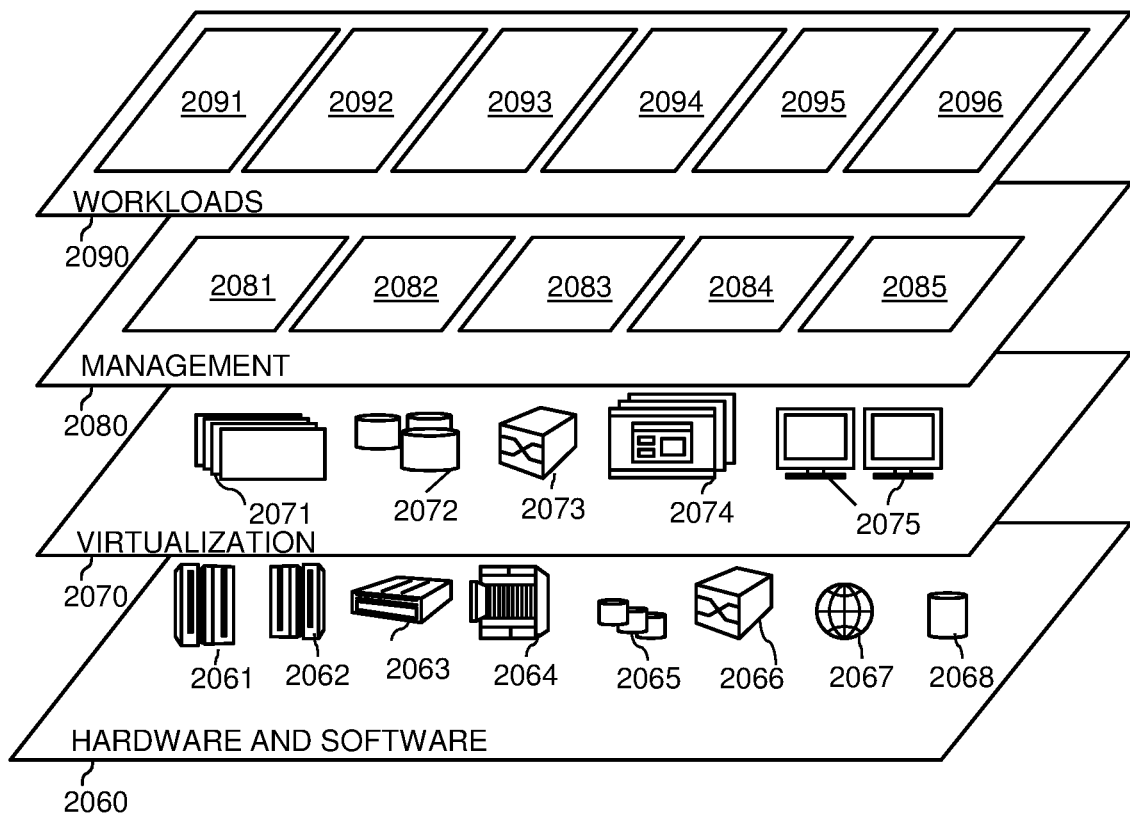
FIG. 10 is a block diagram depicting abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and implementing an artificial intelligence (AI) ecosystem 2096, for example, adapting specifications for an artificial intelligence (AI) ecosystem.

What is claimed is:

1. A computer-implemented method for adapting specifications of an artificial intelligence (AI) ecosystem, comprising:
   receiving, using a communications network, a login to a new AI ecosystem by a computer of a user;
   determining, using a cloud based account of the user communicating with the computer, specifications from an existing AI ecosystem of the user which is at a different location from the new AI ecosystem, the specifications including preferences and historical data related to the existing AI ecosystem based on usage of existing machines;
   determining, by accessing a knowledge corpus using the cloud-based account, adaptive functionality, using the computer, for new machines in the new AI ecosystem, based on comparing capabilities, availabilities, and capacities of the new machines with the existing machines in the existing AI ecosystem, the adaptive functionality being based on the specifications including the preferences and the historical data for the existing AI ecosystem being accessed in the knowledge corpus;

pairing, in the new AI ecosystem, the new machines to the computer;

determining an activity which cannot be executed in the new AI ecosystem;

determining alternative devices for implementation of the activity, in response to a command received at the computer from the user, when the activity cannot be executed in the new AI ecosystem; and applying the specifications including the adaptive functionality to the new machines of the new AI ecosystem, wherein the adaptive functionality includes instructions as program code for execution by a computer communicating with the new machines.

2. The method of claim 1, further comprising:
determining workflow functions for existing machines in the exiting AI ecosystem and applying the workflow functions to new machines in the new AI ecosystem.

3. The method of claim 1, further comprising:
determining workflow functions for existing machines in the exiting AI ecosystem and adapting the workflow functions of the exiting machines for new machines in the new AI ecosystem.

4. The method of claim 1, further comprising:
determining workflow functions for existing machines in the exiting AI ecosystem and adapting the workflow functions of the exiting machines for new machines in the new AI ecosystem, wherein the adapting of the workflow functions includes changing parameters of the workflow functions based on parameters of the new machines.

5. The method of claim 1, further comprising:
determining workflow functions for existing machines in the exiting AI ecosystem;
determining workflow function for new machines in the new AI ecosystem;
analyzing the workflow functions for both the existing machines and the new machines based on parameters for the new machines and the preferences and the historical data related to the existing AI ecosystem; and
adapting the workflow functions of the exiting machines for new machines in the new AI ecosystem based on the analysis of the workflow functions.

6. The method of claim 1, wherein the new AI ecosystem is at a different location than the exiting AI ecosystem.

7. The method of claim 1, wherein the new AI ecosystem and the existing AI ecosystem include multiple machines or devices, respectively.

8. The method of claim 1, wherein the new AI ecosystem includes multiple devices with different availability, capacity, and specifications, from multiple devices in the existing AI ecosystem.

9. The method of claim 1, wherein the new AI ecosystem includes multiple devices with different specifications from multiple devices in the existing AI ecosystem, the specifications including availability, and capacity; and the method further comprising:
analyzing the specifications of the multiple devices in the new AI ecosystem and analyzing the specification in the existing AI ecosystem, the analysis including comparing the specifications, respectively; and
determining modification or adaptions for the new AI ecosystem based on the analysis.

10. The method of claim 1, further comprising:
generating a model at least in part incorporating the determining of the specifications from the existing AI ecosystem;
updating the specifications from the existing AI ecosystem;
updating specifications from the new ecosystem; and
updating the applying of the specifications from the existing AI ecosystem to the new AI ecosystem.

11. The method of claim 1, further comprising:
the existing ecosystem communicating with the cloud based account using a communications network.

12. The method of claim 1, wherein the historical data is stored in a knowledge corpus database.

13. The method of claim 1, wherein the remote-based account is cloud based.

14. A system using a computer for adapting specifications of an artificial intelligence (AI) ecosystem, which comprises:
a computer system comprising; a computer processor, a computer-readable storage medium, and program instructions stored on the computer-readable storage medium being executable by the processor, to cause the computer system to perform the following functions to;
receiving, using a communications network, a login to a new AI ecosystem by a computer of a user;
determining, using a cloud based account of the user communicating with the computer, specifications from an existing AI ecosystem of the user which is at a different location from the new AI ecosystem, the specifications including preferences and historical data related to the existing AI ecosystem based on usage of existing machines;
determine, by accessing a knowledge corpus using the cloud based account, adaptive functionality, using the computer, for new machines in the new AI ecosystem, based on comparing capabilities, availabilities, and capacities of the new machines with the existing machines in the existing AI ecosystem, the adaptive functionality being based on the specifications including the preferences and the historical data for the existing AI ecosystem being accessed in the knowledge corpus;
pair, in the new AI ecosystem, the new machines to the computer;
determine an activity which can not be executed in the new AI ecosystem;
determine alternative devices for implementation of the activity, in response to a command received at the computer from the user, when the activity can not be executed in the new AI ecosystem; and
apply the specifications including the adaptive functionality to the new machines of the new AI ecosystem, wherein the adaptive functionality includes instructions as program code for execution by a computer communicating with the new machines.

15. The system of claim 14, further comprising functions to:
determine workflow functions for existing machines in the exiting AI ecosystem and applying the workflow functions to new machines in the new AI ecosystem.

16. The system of claim 14, further comprising functions to:
determine workflow functions for existing machines in the exiting AI ecosystem and adapting the workflow functions of the exiting machines for new machines in the new AI ecosystem.

17. The system of claim 14, further comprising functions to:
- determine workflow functions for existing machines in the exiting AI ecosystem and adapting the workflow functions of the exiting machines for new machines in the new AI ecosystem, wherein the adapting of the workflow functions includes changing parameters of the workflow functions based on parameters of the new machines.

18. The system of claim 14, further comprising functions to:
- determine workflow functions for existing machines in the exiting AI ecosystem;
- determine workflow function for new machines in the new AI ecosystem;
- analyze the workflow functions for both the existing machines and the new machines based on parameters for the new machines and the preferences and the historical data related to the existing AI ecosystem; and
- adapt the workflow functions of the exiting machines for new machines in the new AI ecosystem based on the analysis of the workflow functions.

19. The system of claim 14, wherein the new AI ecosystem is at a different location than the exiting AI ecosystem.

20. A computer program product for adapting specifications of an artificial intelligence (AI) ecosystem, the specifications based on an existing AI ecosystem of a user, the computer program product comprising a computer readable storage medium having program instructions embodied therewith, the program instructions executable by a computer to cause the computer to perform functions, by the computer, comprising the functions to:
- receive, using a communications network, a login to a new AI ecosystem by a computer of a user;
- determine, using a cloud based account of the user communicating with the computer, specifications from an existing AI ecosystem of the user which is at a different location from the new AI ecosystem, the specifications including preferences and historical data related to the existing AI ecosystem based on usage of existing machines;
- determine, by accessing a knowledge corpus using the cloud based account, adaptive functionality, using the computer, for new machines in the new AI ecosystem, based on comparing capabilities, availabilities, and capacities of the new machines with the existing machines in the existing AI ecosystem, the adaptive functionality being based on the specifications including the preferences and the historical data for the existing AI ecosystem being accessed in the knowledge corpus;
- pair, in the new AI ecosystem, the new machines to the computer;
- determine an activity which cannot be executed in the new AI ecosystem;
- determine alternative devices for implementation of the activity, in response to a command received at the computer from the user, when the activity cannot be executed in the new AI ecosystem; and
- apply the specifications including the adaptive functionality to the new machines of the new AI ecosystem, wherein the adaptive functionality includes instructions as program code for execution by a computer communicating with the new machines.

\* \* \* \* \*